(12) United States Patent
Ho

(10) Patent No.: US 7,814,476 B2
(45) Date of Patent: Oct. 12, 2010

(54) SYSTEMS AND METHODS FOR UPDATING SOFTWARE

(75) Inventor: Stanley M. Ho, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2292 days.

(21) Appl. No.: 10/285,840

(22) Filed: Oct. 31, 2002

(65) Prior Publication Data

US 2004/0088694 A1     May 6, 2004

(51) Int. Cl.
*G06F 9/44* (2006.01)

(52) U.S. Cl. ........................ 717/169; 717/170

(58) Field of Classification Search .............. 717/169
See application file for complete search history.

(56) References Cited

U.S. PATENT DOCUMENTS

| | | | | |
|---|---|---|---|---|
| 5,577,244 A * | 11/1996 | Killebrew et al. | ........... | 717/169 |
| 5,675,803 A * | 10/1997 | Preisler et al. | ............... | 717/131 |
| 5,832,520 A * | 11/1998 | Miller | ......................... | 707/203 |
| 5,999,740 A * | 12/1999 | Rowley | ....................... | 717/173 |
| 6,158,049 A * | 12/2000 | Goodwin et al. | ............ | 717/158 |
| 6,167,567 A * | 12/2000 | Chiles et al. | ................. | 717/173 |
| 6,185,734 B1 | 2/2001 | Saboff et al. | ................. | 717/164 |
| 6,216,175 B1 * | 4/2001 | Sliger et al. | .................. | 717/169 |
| 6,230,316 B1 * | 5/2001 | Nachenberg | ................ | 717/169 |
| 6,363,524 B1 * | 3/2002 | Loy | ............................. | 717/170 |
| 6,434,744 B1 * | 8/2002 | Chamberlain et al. | ....... | 717/168 |
| 6,466,999 B1 * | 10/2002 | Sliger et al. | .................... | 710/68 |
| 6,493,871 B1 * | 12/2002 | McGuire et al. | ............. | 717/173 |
| 6,526,574 B1 * | 2/2003 | Jones | .......................... | 717/168 |
| 6,557,054 B2 | 4/2003 | Reisman | ....................... | 710/33 |
| 6,594,822 B1 * | 7/2003 | Schweitz et al. | ............. | 717/140 |
| 6,912,711 B1 * | 6/2005 | Curtis et al. | ................. | 717/173 |
| 6,931,626 B2 * | 8/2005 | Sheedy | ........................ | 717/122 |

FOREIGN PATENT DOCUMENTS

WO          WO 9712508 A2 *  4/1997

OTHER PUBLICATIONS

Joseph Pranevich, "Kernel Korner: Contributing to the Linux Kernel—Diff and Patch", Jun. 2000, Linux Journal, vol. 2000, Issue 74es, Article No. 21.*
Hicks et al., "Dynamic software updating", May 2001, ACM SIGPLAN Notices, PLDI '01, vol. 36 Issue 5, pp. 13-23.*

* cited by examiner

*Primary Examiner*—James Rutten
(74) *Attorney, Agent, or Firm*—Marsh Fischmann & Breyfogle LLP

(57) ABSTRACT

Systems and methods are disclosed for updating a software program through base image patching. In an exemplary method for base image patching, the method includes receiving a patch, retrieving a base image, wherein the base image corresponds to a base version of a software program, and combining the base image with the patch to create an updated program. In another exemplary method, the method includes receiving an updating patch, wherein the updating patch is used to create an updated software program, retrieving a patch from a repository, wherein the patch is a previous update to a stored program, distilling a base image of the stored program using the previous patch, combining the base image with the updating patch to create an updated program, and replacing the stored program with the updated program.

1 Claim, 7 Drawing Sheets

SYSTEMS AND METHODS FOR UPDATING SOFTWARE

BACKGROUND OF THE INVENTION

I. Field of the Invention

The present invention generally relates to updating software, including the use of patching methodologies to update software programs. More particularly, the invention relates to systems and methods for updating software using a base image and an updating patch.

II. Background Information

Traditionally, software programs need to be updated due to, for example, the discovery of critical bugs or need for improvements. When programs need to be updated, a patch can be used. A patch may include compiled code, e.g., a binary file, which is developed and distributed as a replacement for or an insertion into a program. The patch may be provided to program users through various methods, such as through an automatic update mechanism or the download of a patch. The patch may provide an update to critical bugs in the program. The patch may also be used to add functionalities to the program or remove functionalities from the program.

Patching is a process of applying changes to a single file, or a set of files, in a directory structure. The file, or set of files, may be compiled code, a text text file in a directory. Basic patching methods include a single-version patch method and a multi-version patch method.

A single-version patch method is used for updating a particular version of a program. Applying the patch requires the installed program to meet certain requirements, such as being a specific version of a program. A single-version patch method utilizes a patch with a small patch size tied to a specific version of a program. If a program has multiple versions, a different patch will need to be provided for each version of the program. Once the patch is applied to the installed program, the previous image of the program will be changed to the patched version of the program.

A multi-version patch method updates multiple versions of the program. The multi-version patch contains changes for each version of the program. While the multi-version patch is more flexible in terms of program version requirements, the overall size of the patch needed is increased.

Accordingly, there is a need for improved methods and systems for updating or patching programs from a single patch file. In addition, there is a need for updating programs utilizing a patch with a small file size and the ability to update multiple versions of a program.

SUMMARY OF THE INVENTION

Systems and methods consistent with embodiments of the present invention provide for updating a program through base image patching. In accordance with one embodiment of the invention, a method is provided for base image patching of a program, the method comprises: receiving an updating patch; retrieving a stored base image, wherein the base image corresponds to a base version of the program for performing updates; and combining the base image with the patch to create an updated program.

In accordance with another embodiment of the invention, a method is provided for updating software. The method comprises: receiving an updating patch, wherein the updating patch is used to create an updated software program; retrieving a patch from a repository, wherein the patch is a previous update to a stored software program; distilling a base image of the stored program using the patch from the repository; combining the base image with the updating patch to create the updated program; and replacing the stored program with the updated program.

In accordance with yet another embodiment of the invention, a method is provided for updating a program on a user device. The method comprises: installing a base image and a patch on the user device, where the combination of the base image and the patch is the program; receiving an updating patch that replaces the installed patch; updating a registry with information about the updated program; and running the updated program, which is a combination of the base image and the updated patch.

In accordance with another embodiment of the invention, a method is provided that comprises: installing a program in a workstation; storing a base image of the program in a repository associated with the workstation, wherein the base image corresponds to a base version of the program for performing updates; receiving an updating patch for the program; retrieving the base image from the repository; combining the base image with the updating patch to create an updated program; replacing the installed program with the updated program; and running the updated program, which is a combination of the base image and the updated patch.

In accordance with still another embodiment of the invention, a system is provided for updating a software program. The system comprises: means for receiving a patch; means for retrieving a base image, wherein the base image is a base version of the software program for performing updates; means for combining the base image with the patch to create an updated program; and means for updating a registry with the updated program information.

In accordance with an additional embodiment of the invention, a computer-readable medium is provided that stores instructions, which when executed by a computer perform steps in a method for updating a program. The method comprises: receiving a patch; retrieving a base image, wherein the base image is a base version of the program; combining the base image with the patch to create an updated program; and replacing the program with the updated program.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings provide a further understanding of embodiments of the invention and, together with the detailed description, explain certain features and exemplary embodiments of the invention. In the drawings.

DETAILED DESCRIPTION

Consistent with embodiments of the invention, methods and systems are provided for updating or patching a program. The updated program may be created as a combination of a base image and a patch. The base image may correspond to a base version of the program through which updates can be performed. The patch includes accumulative information, which can be combined with the base image to create an updated program. The patch may be provided to perform various updates, such as removing or correcting bugs in the program, adding functionalities to the program and/or removing functionalities from the program.

In one embodiment of the invention, when a user stores the program on a computer, a base image of the program is also stored in a repository. The repository may be, for example, a local storage location in the memory of the workstation or computer of the user, or a centralized storage location in the memory of a mainframe or server accessible to the user. When the program needs to be updated, a patch may be created. To update the program on the computer, the patch is combined with the base image stored in the repository, creating a new version of the program on the user's computer.

In accordance with another embodiment of the invention, a patch is stored in a repository. A program, which is a combination of a base image and the patch, is stored in another storage location. When the program needs to be updated, a new patch is created. To update the program, the patch stored in the repository is used to distill the base image from the stored program. The base image is then combined with the new patch to generate an updated program that replaces the previous version of the program. The new patch may then be stored in the repository to facilitate subsequent updates to the program.

Embodiments of the present invention may be implemented in connection with various types of software updates. By way of non-limiting examples, software updates may be performed with respect to an operating system or programs associated with an operating system, such as the Java Runtime Environment (JRE) on Windows XP. Other types of software that can be updated include computer games, browsers, e-mail applications, word processing applications, spreadsheet applications, financial applications, image or graphics-related programs, as well as other applications or software products. Other types of operating systems include all Windows systems, MacOS, UNIX, Linux, or other types of operating systems.

Figure 1:
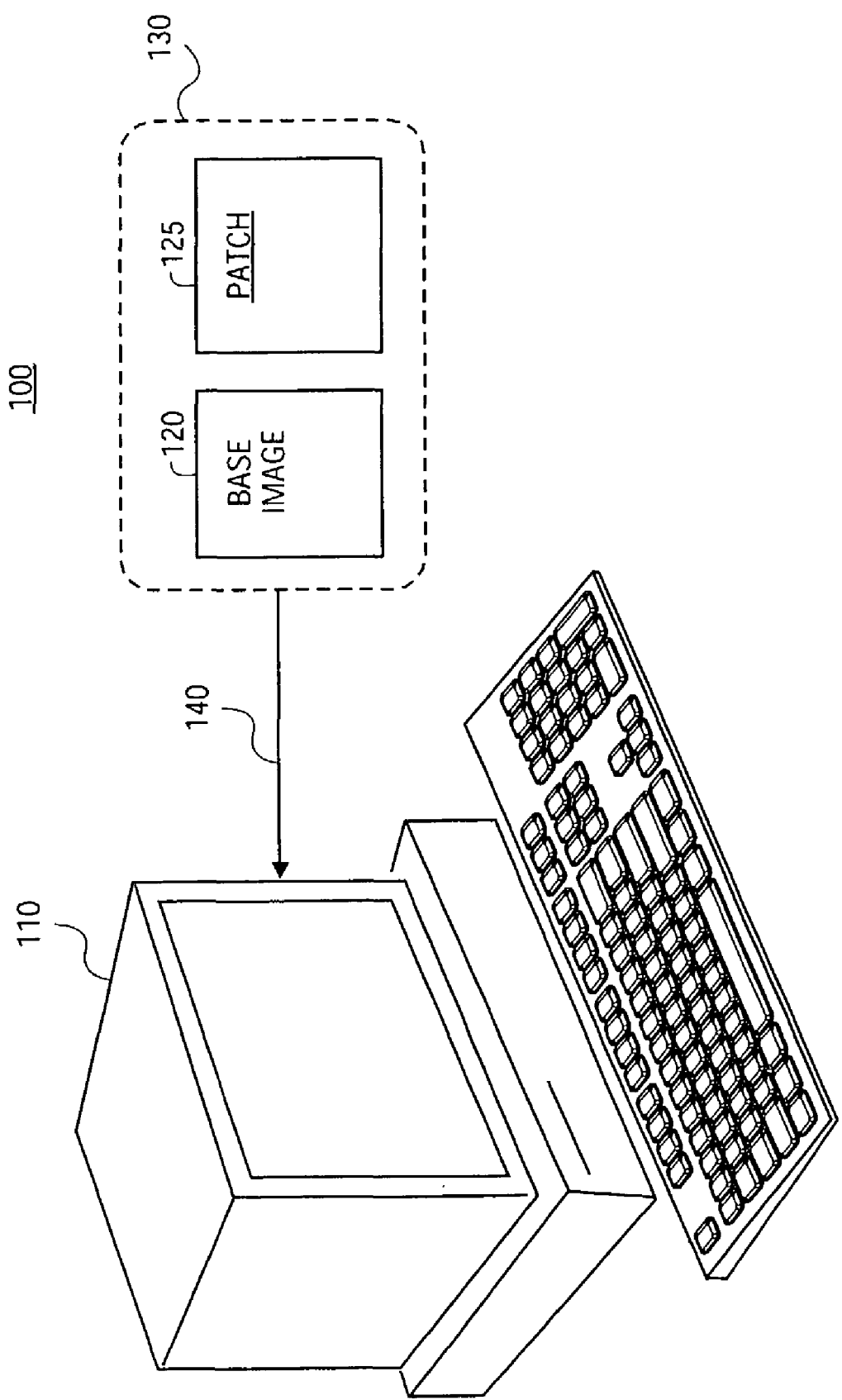
FIG. 1 illustrates an exemplary system for updating software, consistent with embodiments of the present invention.

FIG. 1 depicts an exemplary system 100 for updating a software program, consistent with embodiments of the invention. As shown in FIG. 1, system 100 includes a user device 110 and a program 130. The user device 110 may be implemented as a workstation running an operating system, such as Windows 98 2nd Edition, Windows ME, Windows NT 4.0 Service Pac Service Pack 2 or later, Windows XP Home Edition, or Windows XP Professional Edition. Consistent with embodiments of the invention, user device 110 may also be implemented as a personal computer, a laptop or any other type of device capable of executing program 130. For purposes of illustration, however, embodiments of the invention will be described herein with reference to user device 110 being implemented as a workstation.

Program 130 may include a base image 120 and a patch 125. Base image 120 may be a version of a disk image of the program that sets the baseline for patch generation and updates. For example, Java 2 Standard Edition ("J2SE") 1.4.2 could be the base image for all subsequent J2SE v1.4.2_0x releases. Patch 125 may be a replacement to part of base image 120, or compiled code, which can be inserted into base image 120 to create program 130. In one embodiment patch 125 may be used to fix bugs in program 130. In another embodiment, patch 125 may be used to add or remove functionality to program 130. As will be appreciated by those skilled in the art, other types of updates to program 130 with patch 125 are also possible consistent with embodiments of the invention.

In one embodiment, multiple versions of a program may be updated with the same patch. If user A has J2SE v1.4.2_04, with a base image v1.4.2 stored in the repository and user B has J2SE v1.4.2_08, with base image v1.4.2 stored in the repository. Patch v1.4.2_10 may be used by both user A and B to upgrade to v1.4.2_10.

Program 130 may be implemented with software or conventional programming languages. In one embodiment, program 130 is the first version of a software product and is comprised of base image 120 without patch 125. Program 130 and its components may be a binary file. In another embodiment, program 130 may be the second or a later version of a software product, comprising both base image 120 and patch 125.

Program 130 may be stored on a floppy disc, optical disc or any type of physical storage or computer-readable medium. To store program 130 in the memory of workstation 110, the program may be loaded into the workstation using an input/output (I/O) device, such as a disk drive. Workstation 110 may also include conventional data ports, such as ADB, USB, SCSI, FIREWIRE, AAUI and/or BNC ports, to receive and install program 130 through a connection 140. In one embodiment, connection 140 may be a physical connection used for transmitting program 130 or an updating patch to workstation 110. In another embodiment, connection 140 may be implemented as a wired or wireless connection using conventional communication protocols for installing program 130 or transmitting updating patches to workstation 110. In still another embodiment, program 130 may be stored or exist on another workstation that is connected to workstation 110 through connection 140 and/or a network (not shown). The network may comprise one or more private network(s) (such as an intranet or LAN) and/or public network(s) (such as the Internet or PSTN). This approach may also be used for providing an updating patch to workstation 110 that is stored on another workstation or central server.

Figure 2:
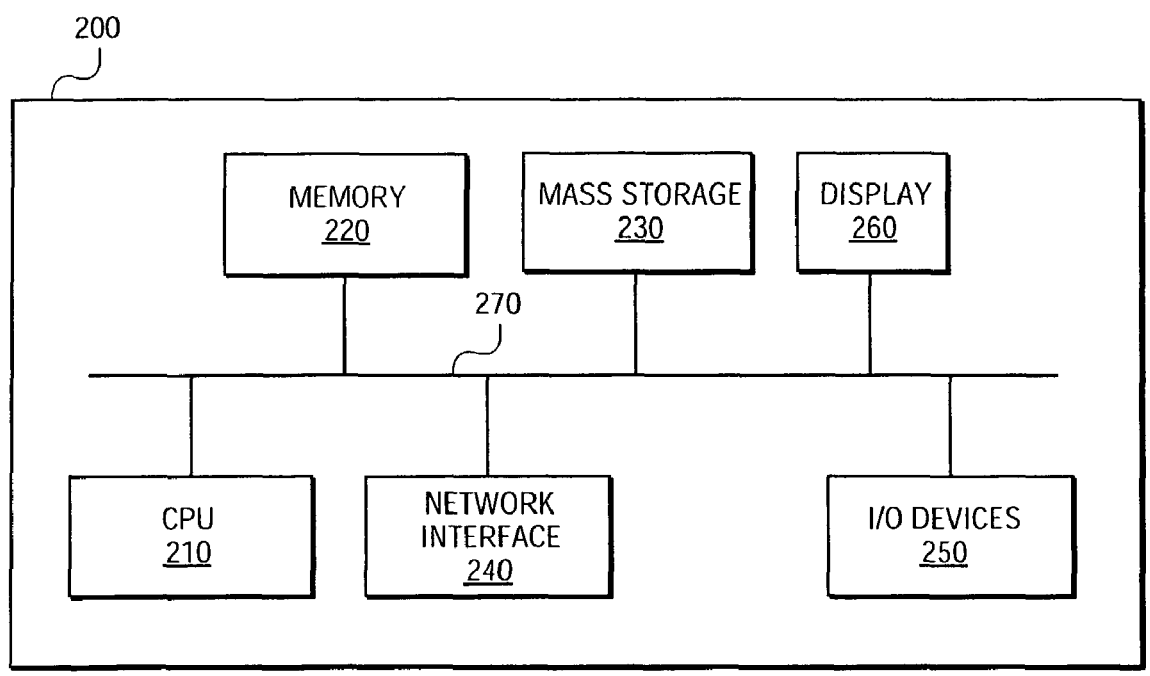
FIG. 2 is a block diagram of an exemplary computing system, consistent with embodiments of the present invention.

FIG. 2 is a block diagram of an exemplary computing system 200, consistent with embodiments of the invention. Computing system 200 may represent, for example, the internal components of workstation 110. By way of example, a program or set of instructions used to implement patching on workstation may be implemented in computing system 200.

Computing system 200 may include a number of components, such as a processor or central processing unit (CPU) 210, a memory 220, a mass storage 230, a network interface 240, I/O devices 250, and/or a display 260. Such components may be interconnected by a system bus 270. CPU 210 may be a microprocessor such as the Pentium® family of microprocessors manufactured by Intel Corporation. However, any other suitable microprocessor, micro-, mini-, or mainframe computer may be used, such as a micro-controller unit (MCU), or a digital signal processor (DSP).

Memory 220 may include a random access memory (RAM), a read-only memory (ROM), a video memory, mass storage, and/or cache memory that is implemented with fixed or removable media (e.g., magnetic, optical or magnetic optical storage systems, or other available mass storage technology). Memory 220 stores support modules such as, for example, a basic input/output system (BIOS), an operating system (OS), a program library, a compiler, an interpreter, and/or a text-processing tool. Support modules are commercially available and can be installed on computing system 200 by those of skill in the art. For simplicity, such modules are not illustrated. Further, memory 220 may contain an operating system, an application routine, a program, an application-programming interface (API), and/or other instructions for performing methods consistent with embodiments of the invention.

In one embodiment, mass storage 230 may be implemented as a magnetic disk or optical disk, along with a corresponding disk drive. In still another embodiment, mass storage 230 may be used for storing information and instructions, such as program 130. Mass storage 230 may also be partitioned to include a repository for storing a base image or patch.

Network interface 240, examples of which include Ethernet, dial-up telephone and/or other conventional data port connections, may be used to communicate with other devices through, for example, connection 140 and/or a communication network (not shown). Computing system 200 may also receive input via by input/output (I/O) devices 250, which may include a keyboard, mouse, pointing device, or other like devices. Computing system 200 may also present information to a user via display 260.

Bus 270 may be a bi-directional system bus. For example, bus 270 may contain thirty-two address bit lines for addressing a memory 220 and thirty-two bit data lines across which data is are transferred among the components. Alternatively, multiplexed data/address lines may be used instead of separate data and address lines.

Figure 3C:
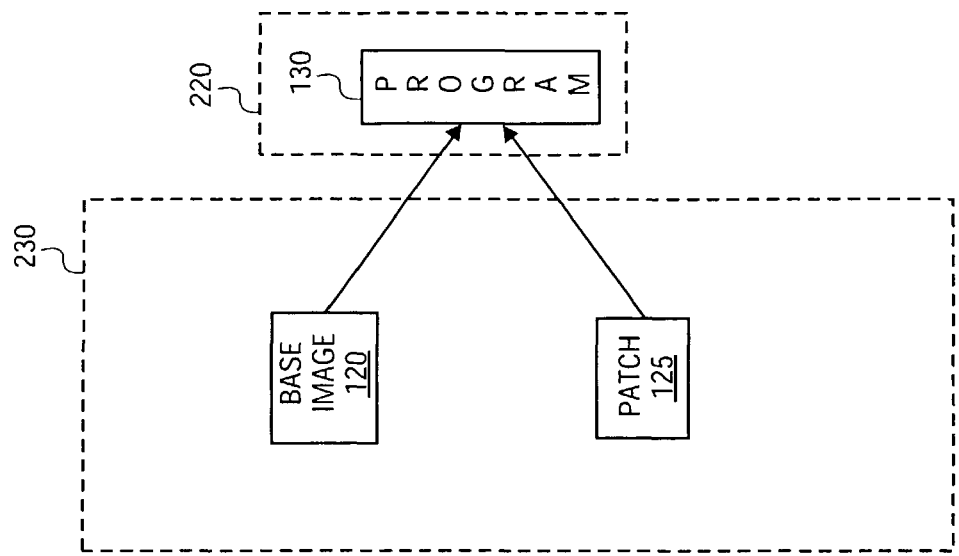
FIGS. 3A-3C are block diagrams of exemplary storage configurations, consistent with embodiments of the present invention.
Figure 3B:
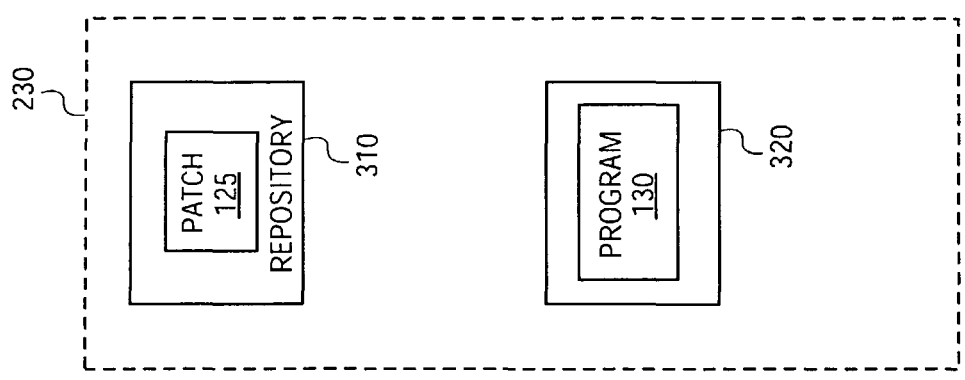
Figure 3A:
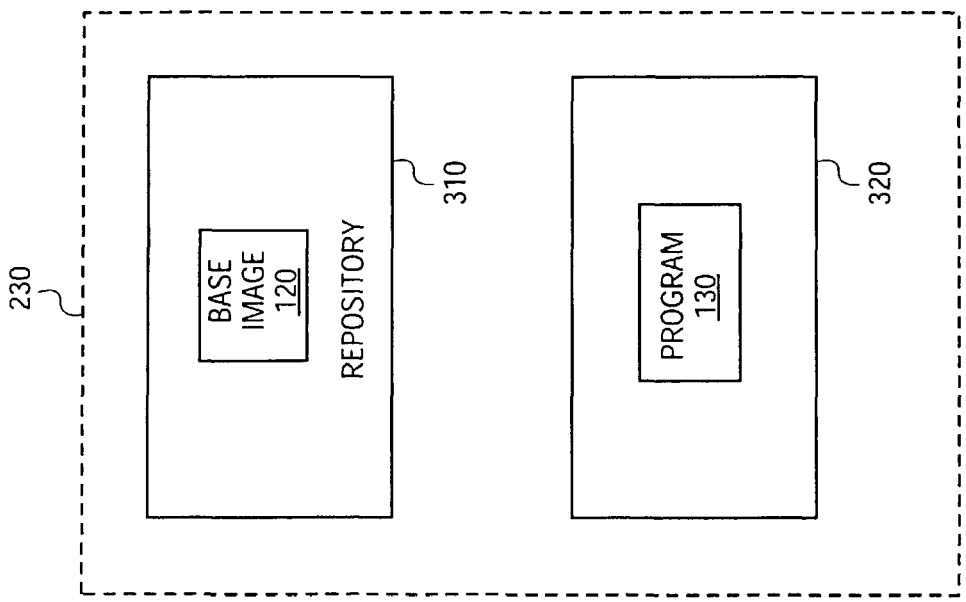

FIGS. 3A-3C are block diagrams of exemplary storage configurations, consistent with embodiments of the invention. FIG. 3A is a block diagram of mass storage 230, consistent with an embodiment of the invention. As illustrated in FIG. 3A, mass storage 230 contains a repository 310 and other storage 320. Base image 120 is stored in repository 310. Program 130, which is a combination of base image 120 and patch 125, is stored in other storage 320. Repository 310 may be a centralized location on a user system, such as mass storage 230 on workstation 110 or a network location, used to store a base image for the software program. In one embodiment, to update program 130 base image 120 in repository 310 is combined with a new patch. The program 130 in other storage 320 may then be replaced by the updated program.

FIG. 3B is a block diagram of mass storage 230, consistent with another embodiment of the invention. As illustrated in FIG. 3B, mass storage 230 includes a repository 310 and other storage 320. In the exemplary embodiment, patch 125 is stored in repository 310. Further, program 130, which is a combination of base image 120 and patch 125, is stored in other storage 320. To update program 130, patch 125 stored in repository 310 is used to distill a base image from program 130 stored in other storage 320. By way of example, patch 125 may be used to change program 130 back into a base image. This base image can then be combined with a new patch to form an updated program. The updated program may then replace the program 130 in other storage 320. Further, the new patch may be stored in repository 310 to facilitate subsequent updates to the program.

FIG. 3C is a block diagram of mass storage 230, consistent with still another embodiment of the invention. As illustrated in the exemplary embodiment of FIG. 3C, mass storage 230 stores base image 120 and patch 125. During operation, base image 120 and patch 125 may be combined to form program 130 in memory 220. As disclosed above with reference to FIG. 2, memory 220 may include a random access memory (RAM), a read-only memory (ROM), a video memory, mass storage, and/or cache memory that is implemented with fixed or removable media. To update the program, a new patch may replace patch 125 stored in mass storage 230. Then, when the program is executed, the new patch is used with base image 120 to create an updated program.

Figure 4:
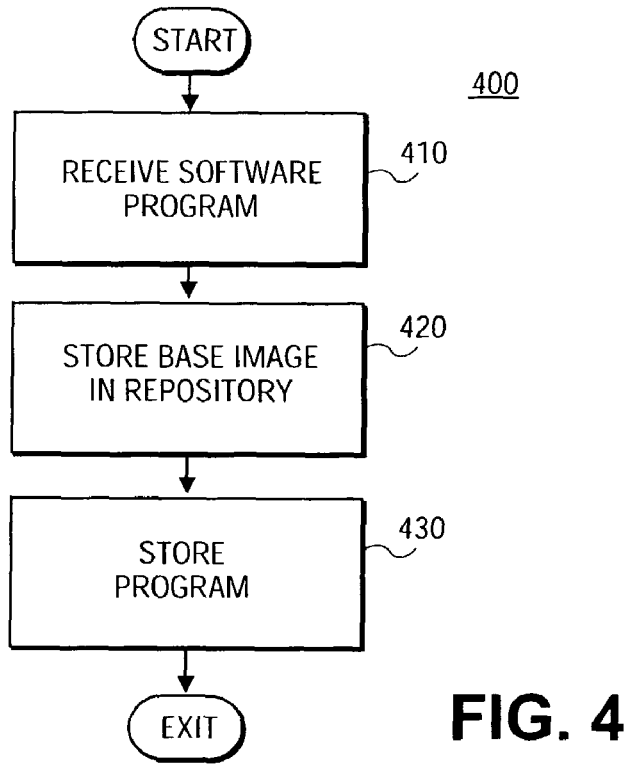
FIG. 4 is a flowchart of an exemplary method for installing an updateable software program.

FIG. 4 is a flowchart of an exemplary method for installing a software product or program, such as program 130 on workstation 110. As shown in FIG. 4, workstation 110 may receive program 130 (step 410). In one embodiment, program 130 may include base image 120 and patch 125. In another embodiment, program 130 may comprise only base image 120. After receiving program 130, workstation 110 stores base image 120 in repository 310 (step 420). Further, workstation 110 stores program 130 in other storage 320 (step 430). A mass storage configuration such as that illustrated in FIG. 3A may be used for implementing steps 420 and 430.

Consistent with embodiments of the invention, the exemplary flow chart or steps of FIG. 4 may be modified. For example, in one embodiment, program 130 may be stored before base image 120. In another embodiment, instead of base image 120 being stored in repository 310, patch 125 may be stored in a repository (see, for example, the embodiment of FIG. 3B). In still another embodiment, base image 120 and patch 125 may be both stored in mass storage, and combined into program 130 when loaded into memory 220 (see, for example, the embodiment of FIG. 3C). In yet another embodiment, a program may be received through an installer. When the installer is executed, it determines if a base image is in a repository. If so, installer downloads a patch installer to generate a patched image, where the patched image is the program. If not, it downloads both a base image and the patch installer to generate the patched image.

Figure 5:
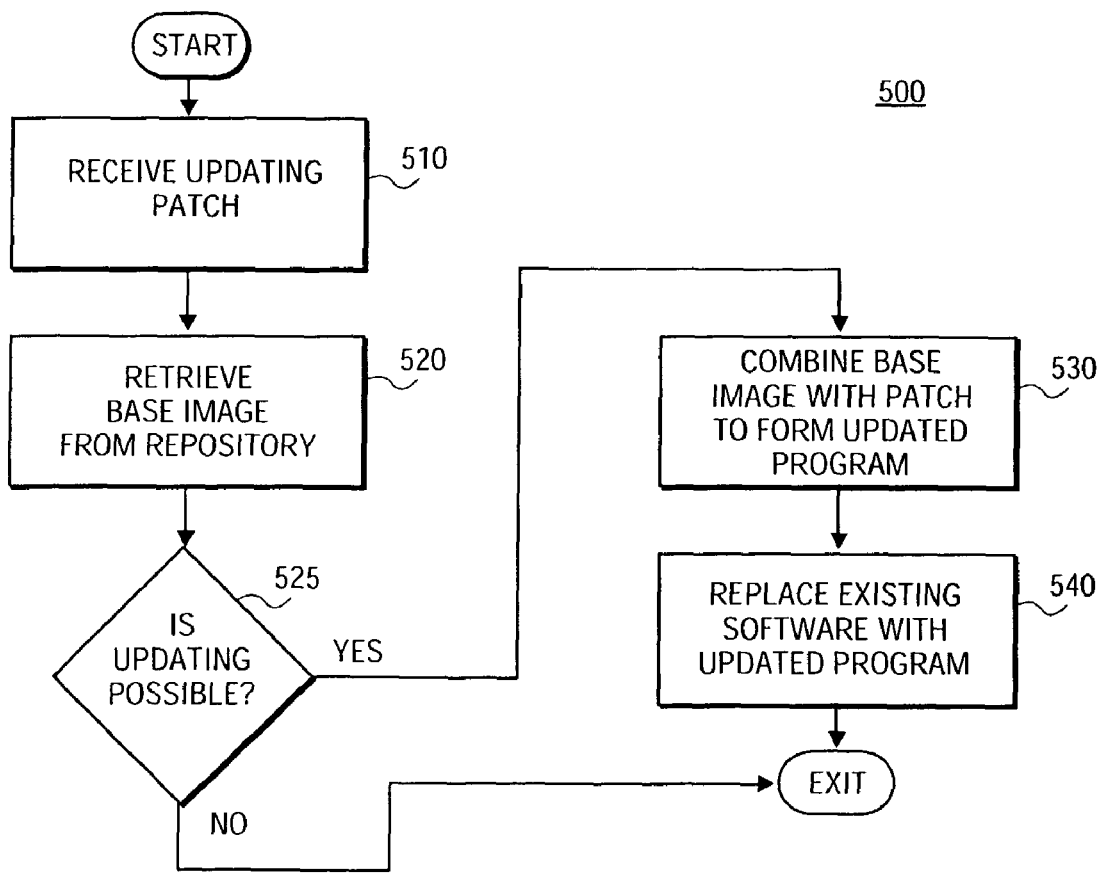
FIG. 5 is a flowchart of an exemplary method for updating a software program using a stored base image, consistent with embodiments of the present invention.

FIG. 5 is a flowchart of an exemplary method for updating a program, such as program 130. When developers in some way have changed or updated program 130, a new program is created. In order to update program 130 on workstation 110, workstation 110 receives a patch 125 (step 510). A patch generation process may be utilized to create the updating patch. In one embodiment, a patch may contain the minimum number of bytes required to turn a program into an updated program. The patch generation may be at the byte level (e.g., a binary file may be created) or the file level. Further, the patch generation should be accumulative, such that the newer version of the patch is a superset of all older versions, relative to the same base version image.

The updated program is a new program created by applying the patch to the base image of the program. The binary file for the updated program after patching is the same as the new program; thus, eliminating the need for the user to individually acquire and install the new program. In one embodiment, a patch generation process or algorithm may be used to generate the patch. In another embodiment, a patchgen utility creates patch files for an update to a program. The patchgen utility may also be used for generating a patch installer by comparing a base JRE image and a new JRE image. In one embodiment, the patch installer is jupdate.exe, an update utility that locates a base image and applies the patch to the base image.

Referring again to FIG. 5, workstation 110 retrieves base image 120 from repository 310 (step 520). Further, the version of program 130 stored in other storage 320 may be analysed to determine if updating is necessary (step 525). Conventional techniques may be implemented to determine the version of program 130. By way of example, assume that program 130 corresponds to a Java™ Runtime Environment (JRE) program. In one embodiment, workstation 110 checks the version of the JRE image and sees if the patch is appropriate for the registered version of JRE. For instance, the version information can be determined through a text file version.dat at <jre.home>/lib, which contains the patch version information. Alternatively, the version information may be determined by running java-fullversion on a command line.

Consistent with embodiments of the invention, other techniques or processes may be employed. For example, to analyze whether an update is necessary, a check may be performed to determine if any patch has been applied before to the program. By way of example, assume again that program 130 corresponds to a JRE program. In such a case, if a patch has been applied to the JRE image before, then a text file version.dat may exist under <jre.home>/lib which contains the patch version information or the base JRE image may be saved in the repository.

As illustrated in FIG. 5, a determination is made whether updating is possible (step 525). If updating is possible (step 525; Yes), then processing continues so that the updated program is created. If, however, no updating is needed (step 525; No), then the process may terminate. Consistent with embodiments of the invention, one or more conditions may be analyzed to determine if updating is possible and necessary. For example, in one embodiment, the patch may be applied if one of the following conditions is met: no patch has been applied to the stored program; or the version of patch received is newer than the one applied before. If none of the condition(s) is satisfied, then a notification may be provided to the user and the process may terminate.

In another embodiment, the user device may receive notification of the need to update a program. The need to update the program may come in the form of, for example, periodic user device reminders, system notifications, or external reminders to the user device. The user device may check if the update has been performed. The user device may determine if an update has been performed by checking the registry to determine if the most recent patch has previously been applied to the base image or checking text files that contain the patch version information. If it is determined that the update is necessary, the user device may receive a patch for updating the program. By way of example, the user device may download the patch.

When an update is necessary (step 525; Yes), the base image 120 is combined with patch 125 to form an updated program (step 530). In one embodiment, base image 120 and patch 125 may be combined using a patch installer. Conventional techniques or methods may be utilized to implement a patch installer. For example, in cases where program 130 is a JRE, the program jupdate.exe may be the patch installer utility used. The program jupdate.exe is a patch installer in the form of Windows self-executable generated by patchgen. It may contain, version information about the base JRE image and the new JRE image, the JRE patch, a simple patching engine, logic to install the patch through the patching engine, and/or logic to update the JRE settings on the system (e.g., Windows registry, control panel, etc.). When the patch installer is executed, it locates the proper version of JRE through the Windows registry and applies the fix if appropriate.

After creating the updated program, program 130 is replaced with the updated program (step 540). In one embodiment, a user may be notified after the patch is applied and updating of the program is completed. Further, when a first patch has been applied, base image 120 (such as a base JRE image) is copied to repository 310. In one embodiment, subsequent patch installation will not change the content of base image 120 in repository 310.

In another embodiment, program 130 is not deleted when the updated program is created. In one embodiment, the base image may be used to generate multiple versions of a program stored in different locations on the same system. More than one version of the program, such as presentation software, may exists on the system, so a user may utilize older version of the program to read an old presentation using the older version of the program. Using newer version of a program may cause errors in the old presentation, but for a new presentation, the user may want to have a newer version of the software to take advantages of new features of the software.

Figure 6:
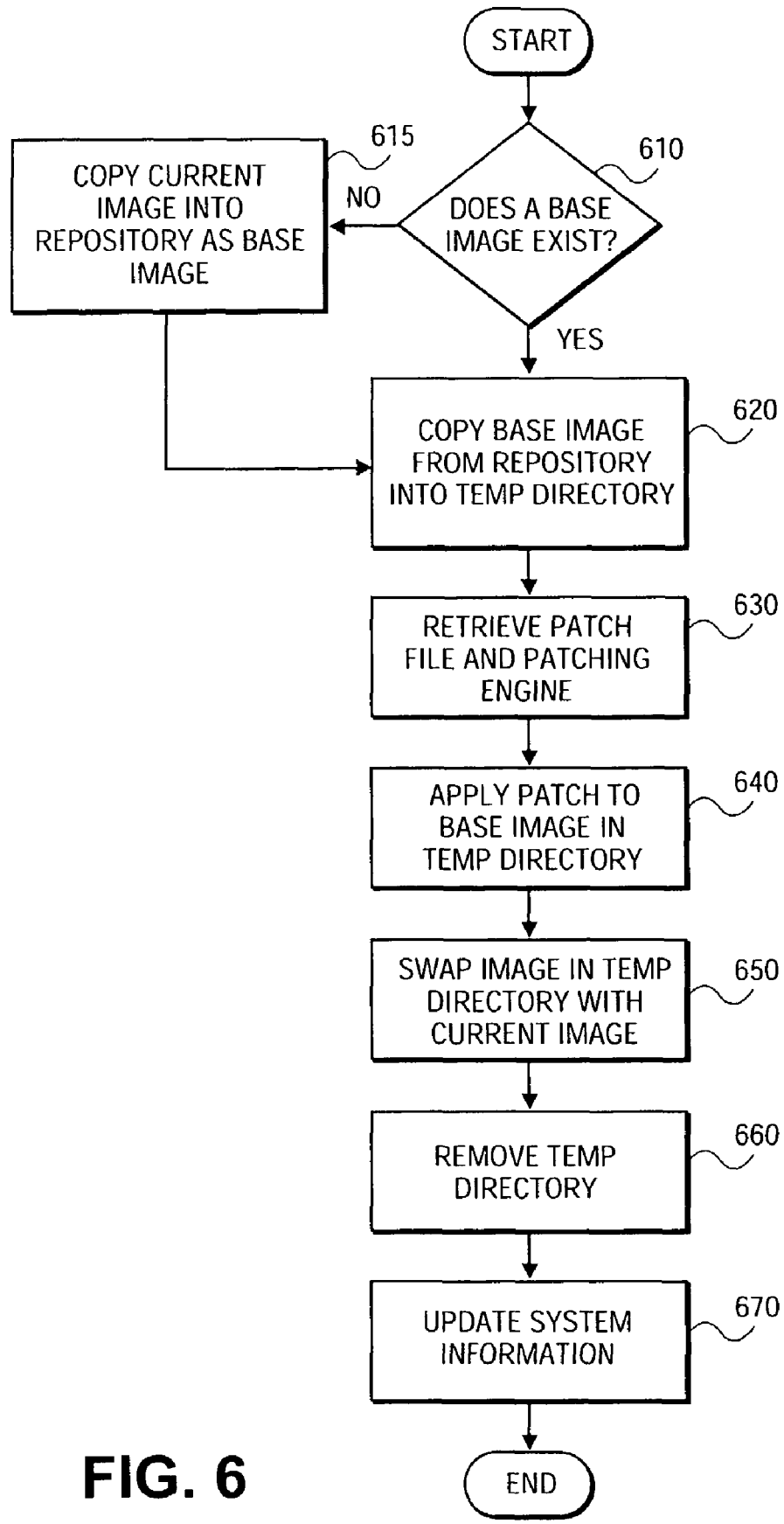
FIG. 6 is a flowchart of an exemplary method for updating a Java Runtime Environment (JRE), consistent with embodiments of the present invention.

FIG. 6 is a flowchart of an exemplary method for updating a JRE, consistent with embodiments of the present invention. In one embodiment, a patch is applied to the base JRE image to update the JRE image. The patch may serve to update all current versions of JRE. When the patch installer is executed, it determines a JRE location through the Windows registry. An example of the location may be HKEY_LOCAL_MACHINE\Software\JavaSoft\Java_Runtime_Environment\<version>\JavaHome. If the version of JRE needs to be updated, the patch is applied.

As illustrated in FIG. 6, a determination is first made as to whether a base image exists (step 610). Such a determination may include checking a repository to determine if the base image exists. By way of example, the current default JRE image may be defined by a registry. If the JRE image has not been patched before, no base image may exist in the repository. If no base image exists (step 610; No), then the current JRE image is copied into the repository as a base image (step 615). If a base image does exist (step 610; Yes), then the base image is copied from the repository into a temporary or "temp" JRE directory (step 620).

An updating patch file and a patching engine are then retrieved (step 630). The updating patch file and patching engine may be contained in a patch installer, such as jupdate.exe created by patchgen. In one embodiment, the patch installer may be available from a Java Update website, such as <http://java.sun.com/getjava/javaupdate/>. The patching engine applies the updating patch to the JRE image in the temp JRE directory (step 640). In one embodiment, the patching engine may apply the patch by simply copying the new file. In another embodiment, the patching engine may apply differences at binary level. The new image in the temp directory becomes the newly patched JRE image. In one embodiment, the version information is updated. This may be done by creating a version.dat file in the temp JRE directory, which contains the patch version information. The current image is swapped with the image in the temp JRE directory (step 650), the temp directory is removed (step 660), and the system wide information is updated (step 670). The update provides system wide information (e.g. registry, etc.) with knowledge of the updated program, so the system will be aware of the version of the new software instead of thinking it is still an old version.

Figure 7:
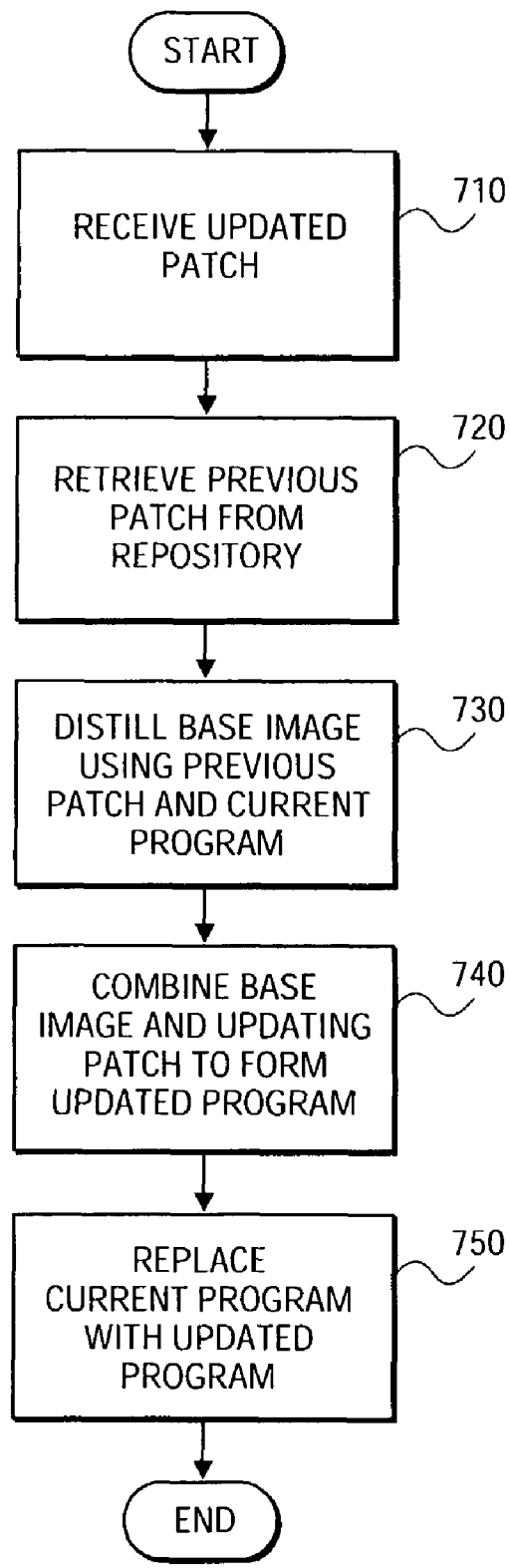
FIG. 7 is a flowchart of an exemplary method for updating a software program using a stored patch, consistent with embodiments of the present invention.

FIG. 7 is a flowchart of an exemplary method for updating a program, such as program 130, using a stored patch. The exemplary embodiment of FIG. 7 may be used in connection with a mass storage configuration, such as that depicted in FIG. 3B. Consistent with embodiments of the invention, in order to update program 130 on workstation 110, workstation 110 receives an updating patch (step 710). In addition, the previous patch is retrieved from a repository (step 720). In one embodiment, every time an update is performed, the updating patch is stored in the repository.

The base image is then distilled using the stored patch and current program (step 730). In one embodiment, the base image is distilled using an unpatch utility. The unpatch utility uses the stored patch to undo all of the changes made during patching the base image. When all of the changes are undone, the remaining image is the base image.

After distilling the base image, the base image and updating patch are combined to form an updated program (step 740). After creating the updated program, the current program is replaced with the updated program (step 750). In one embodiment, a user may be notified after the patch is applied and updating of the program is completed. Further, when a patch has been applied, the patch is copied to the repository. Subsequent patch installation will change the content of the repository to reflect the most recent update. In another embodiment, the repository may be used to store multiple versions of base images (e.g. 1.4.1, 1.4.2, 1.5) and multiple versions of patches (e.g. 1.4.1_01, 1.4.2_03). When a particular version of the base image or patch is retrieved, the system will lookup the proper version from the repository.

Figure 8:
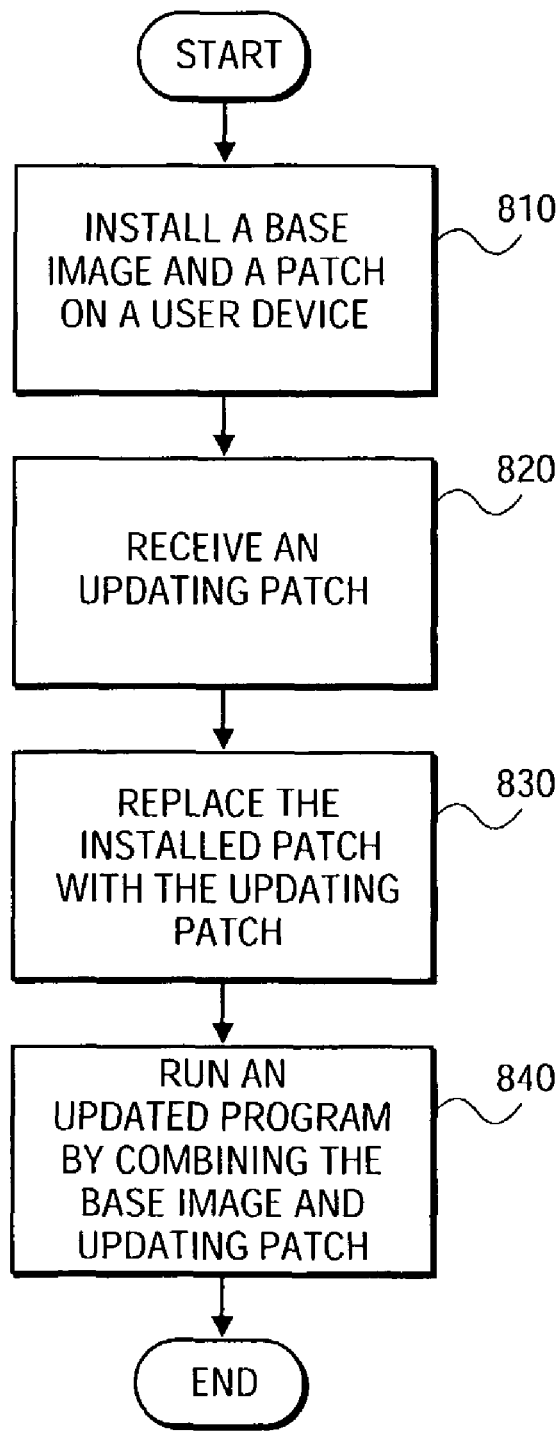
FIG. 8 is a flowchart of another exemplary method for updating a software program, consistent with embodiments of the present invention.

FIG. 8 is a flowchart of an additional exemplary method for updating a program, such as program 130. Consistent with embodiments of the invention, the exemplary method of FIG. 8 may be implemented using a storage approach such as that illustrated in the embodiment of FIG. 3C. Initially, a program is installed by installing both a base image and a patch on a user device (step 810). The base image and patch may be stored in the mass storage. The user device receives an updating patch (step 820). The installed patch is replaced with the updating patch (step 830). When the program is executed, an updated program is created by combining the base image and the updating patch (step 840).

Although embodiments of the present invention are described as being associated with programs stored in memory and other storage mediums, one skilled in the art will appreciate that these aspects can also be stored on, or read from, other types of computer-readable media, such as secondary storage devices, like hard disks, floppy disks, or CD-ROM; a carrier wave from the Internet; or other forms of RAM or ROM. Accordingly, the invention is not limited to the above-described embodiments, but instead is defined by the appended claims in light of their full scope of equivalents.

Further, methods consistent with embodiments of the invention may conveniently be implemented using program modules. Such program modules, when executed, may perform the steps and features disclosed herein, including those disclosed with reference to the exemplary flow charts of FIGS. 4 to 8. No particular programming language has been indicated for carrying out the various procedures described above because it is considered that the operations, stages, and procedures described above and illustrated in the accompanying drawings are sufficiently disclosed to permit one of ordinary skill in the art to practice the instant invention. Moreover, there are many computers and operating systems that may be used in practicing embodiments of the instant invention and, therefore, no detailed computer program could be provided which that would be applicable to these many different systems. Each user of a particular computer will be aware of the language and tools that which are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention also relate to computer-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. For example, the steps of the exemplary methods of FIGS. 4 to 8 may be modified, substituted, deleted or re-ordered as needed. Further, additional steps may be added to the exemplary methods without departing from the scope of the embodiments of the invention. Therefore, it is intended that the specification and examples be considered as exemplary only, with a true scope and spirit of the invention being indicated by the following claims.

What is claimed is:

1. A method for updating a software program, comprising:
receiving an updating patch to update the software program;
retrieving a stored patch from a repository, wherein the stored patch is a previous update to the software program;
distilling a base image of the software program using the stored patch, wherein the base image is a base version of the software program and the software program is a subsequent version of the base version;
combining the base image with the updating patch to create an updated software program; and
replacing the software program with the updated software program.

* * * * *